(12) United States Patent
Zaykov et al.

(10) Patent No.: US 11,138,043 B2
(45) Date of Patent: Oct. 5, 2021

(54) SYSTEM AND METHODS FOR CONTINGENCY BUDGETING FOR TIME-PARTITIONED SYSTEMS

(71) Applicant: Honeywell International s.r.o., Praha-Chodov (CZ)

(72) Inventors: Pavel Zaykov, Brno (CZ); Larry James Miller, Black Canyon City, AZ (US); Srivatsan Varadarajan, St. Louis Park, MN (US); Chittaranjan Kashiwar, Bangalore (IN)

(73) Assignee: Honeywell International s.r.o, Chodov (CZ)

( * ) Notice: Subject to any disclaimer, the term of this patent is extended or adjusted under 35 U.S.C. 154(b) by 344 days.

(21) Appl. No.: 16/420,849

(22) Filed: May 23, 2019

(65) Prior Publication Data
US 2020/0371840 A1 Nov. 26, 2020

(51) Int. Cl.
G06F 9/46 (2006.01)
G06F 9/50 (2006.01)
G06F 17/18 (2006.01)

(52) U.S. Cl.
CPC .......... G06F 9/505 (2013.01); G06F 9/5044 (2013.01); G06F 17/18 (2013.01); *G06F 2209/5011* (2013.01)

(58) Field of Classification Search
CPC ........ G06F 9/505; G06F 9/5044; G06F 17/18; G06F 2209/5011
See application file for complete search history.

(56) References Cited

U.S. PATENT DOCUMENTS

| | | | |
|---|---|---|---|
| 7,302,685 B2 | 11/2007 | Binns et al. | |
| 7,472,389 B2 | 12/2008 | Smith et al. | |
| 9,465,664 B1 * | 10/2016 | Miller | G06F 9/5038 |
| 9,639,401 B1 | 5/2017 | Bertram et al. | |
| 2002/0120663 A1 * | 8/2002 | Binns | G06F 9/4887 718/103 |
| 2002/0198925 A1 | 12/2002 | Smith et al. | |
| 2006/0206881 A1 | 9/2006 | Dodge et al. | |
| 2007/0061788 A1 | 3/2007 | Dodge et al. | |
| 2016/0179575 A9 | 6/2016 | Dodge et al. | |
| 2016/0364267 A1 | 12/2016 | Varadarajan et al. | |

* cited by examiner

*Primary Examiner* — Wissam Rashid
(74) *Attorney, Agent, or Firm* — Fogg & Powers LLC

(57) ABSTRACT

Systems and methods for outlier mitigation in safety-critical systems are provided. In one embodiment, a computer system comprises: a processor comprising one or more processing cores; a scheduling function that schedules the execution of applications, the applications each comprise threads; a contingency budgeting manager (CBM) that defines at least a first pre-determined set of threads from the threads of the applications and assigns a contingency budget pool to the first set of threads. The first set of threads are each scheduled by the scheduling function to execute on a first processing core. The CBM is further configured to monitor execution of each of the threads of the first set of threads to identify when a first thread is an execution time outlier. When the CBM determines that the first thread is an execution time outlier, it allocates additional thread execution time from the contingency budget pool to the first thread.

20 Claims, 8 Drawing Sheets

SYSTEM AND METHODS FOR CONTINGENCY BUDGETING FOR TIME-PARTITIONED SYSTEMS

GOVERNMENT RIGHTS

The project leading to this application has received funding from the Clean Sky 2 Joint Undertaking under the European Union's Horizon 2020 research and innovation program under grant agreement No. 807081.

BACKGROUND

Modern single-core and multi-core processors experience the property of not being very time deterministic in terms of the amount of time needed to execute a given application. That is, given the execution of a particular application multiple times, variations can be expected in the amount of time observed for that application to execute. In multi-core processors, such variations tend to be higher than experienced for single-core processors. Moreover, several factors may contribute to these variations in both single-core and multi-core processors. First, the computer architecture itself may contribute to the non-determinism due to background operations entirely unrelated to the execution of software. For example, hardware configurations may require periodic service of components such as DRAM memory refresh cycles or the processor may need to arbitrate for concurrent access to shared resources. Other qualities of the computer architecture that may lead to non-determinism include the operation of low-level functions such as a branch predictor, memory controller prefetcher and/or the speculative execution of instruction. Finite State Machines, such as may be used to implement the memory controller, may vary in their reaction times differently at different times. Non-computer architectural considerations may also contribute to the non-determinism and variations in application execution times. For example, it may be necessary to handle interrupts during an application execution (e.g., to support an input/output (I/O) operation at a hardware port) which can lead to an increase in the time needed for the processor to complete execution of a software thread. Similarly, the software architecture itself may be non-deterministic in that the code being executed causes episodic occurrences of the application Worst-Case Execution Time (WCET). Moreover, the need to operate with near zero floating point numbers, referred to as denormal numbers, can cause the same execution sequence of instructions to take a much longer time based on the computer architecture's floating point treatment of operands. In some cases, the WCET may only be experienced very occasionally (for example, in response to receiving a very specific rare set of inputs).

While many of these execution time variations may be sufficiently small to be considered insignificant from a statistical perspective, others are statistically significant "outliers." For example, an application thread execution time for a given thread iteration that is more than twice the mean thread execution of time for iterations of that thread could be defined as an outlier. In time-partitioned systems, the occurrence of these outliers consequently lead to drops in processing performance bandwidth, the adoption of highly conservative budgets for executing critical threads, and the creation of processing slack and performance under-utilization. For instance, one potential approach to address non-determinism in thread execution times for critical threads is to identify the impact of outliers occurring for a thread (in terms of execution time over the expected mean execution time or WCET) and compute the thread budget by adding a safety-margin on top of the mean execution time or WCET for that thread. While this approach may appear straight-forward, it has several disadvantages including the addition of processor idle time and high processor under-utilization that will be experienced during non-outlier thread executions. Moreover, determining the proper safety-margin would require the observation of outliers and measuring their impact on every critical thread to which this approach would be applied. The explicit need to determine the impact of these outliers would place additional burdens on the system integration process to determine the cost and impact of these outliers as well as absorbing the overheads into the processing resources.

For the reasons stated above and for other reasons stated below, it will become apparent to those skilled in the art upon reading and understanding the specification, there is a need in the art for method and systems for outlier mitigation in safety-critical systems.

SUMMARY

Systems and methods for outlier mitigation in safety-critical systems are provided. In one embodiment, a computer system with outlier thread mitigation comprises: a processor coupled to a memory, the processor comprising one or more processing cores; a time-partitioned scheduling function, wherein the scheduling function schedules the execution of one or more applications on the one or more processing cores of the processor, wherein the one or more applications each comprise one or more threads; a contingency budgeting manager that defines at least a first pre-determined set of threads from the one or more threads of the one or more applications and assigns a contingency budget pool to the first pre-determined set of threads, wherein the first pre-determined set of threads are each scheduled by the scheduling function to execute on a first processing core of the one or more processing cores, wherein the contingency budgeting manager is pre-configured with a set of contingency budget pools and pre-configured to associate eligible threads of the one or more applications with each of the contingency budget pools; wherein the contingency budgeting manager is further configured to monitor execution of each of the threads of the first pre-determined set of threads to identify when a first thread from the predetermined set of one or more threads is an execution time outlier exceeding a reserved budget; wherein when the contingency budgeting manager determines that the first thread is an execution time outlier, the contingency budgeting manager allocates budget from the contingency budget pool to the first thread execution time.

DRAWINGS

Understanding that the drawings depict only exemplary embodiments and are not therefore to be considered limiting in scope, the exemplary embodiments will be described with additional specificity and detail through the use of the accompanying drawings, in which.

Figure 2:
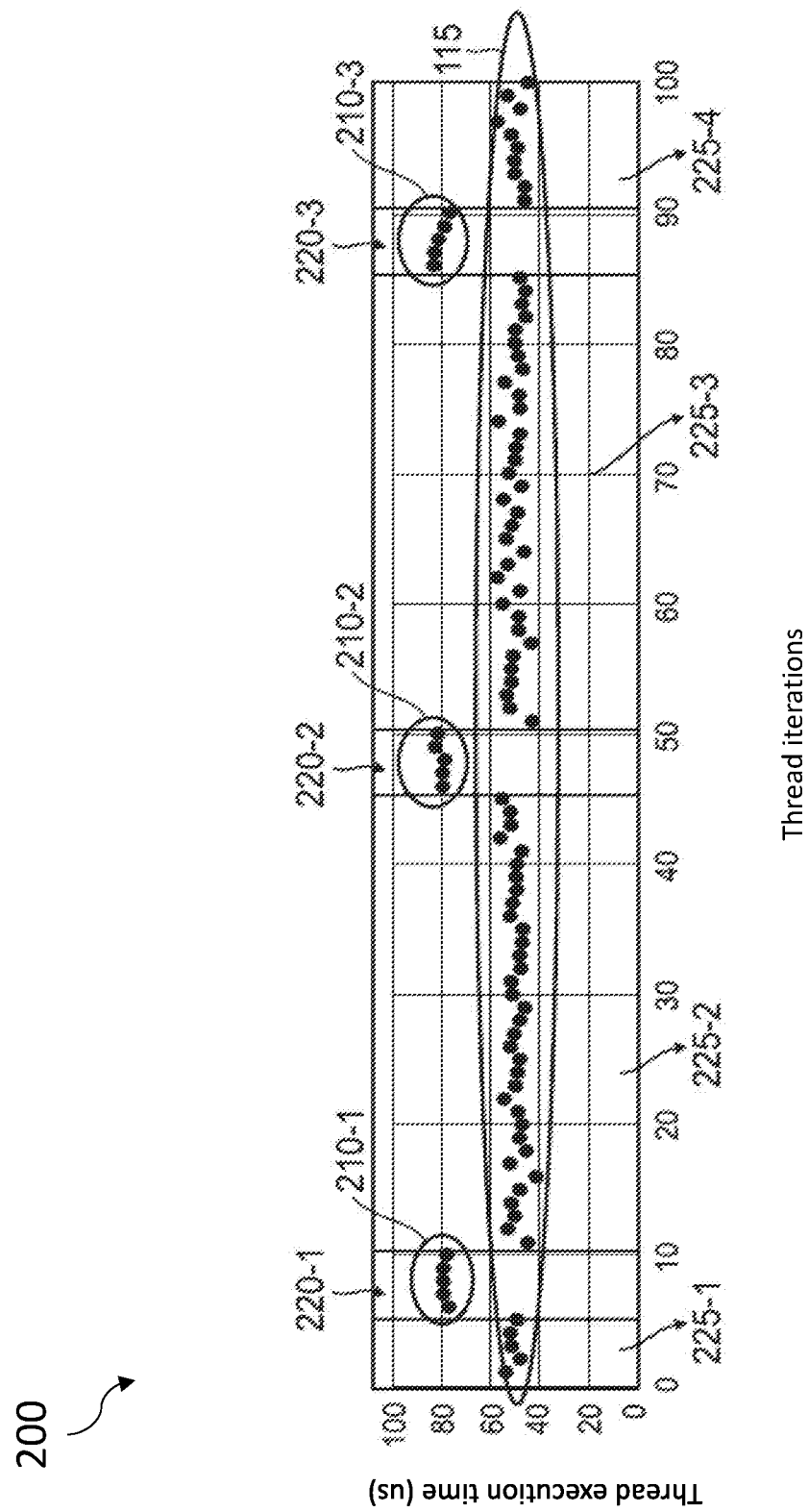
Figure 3:
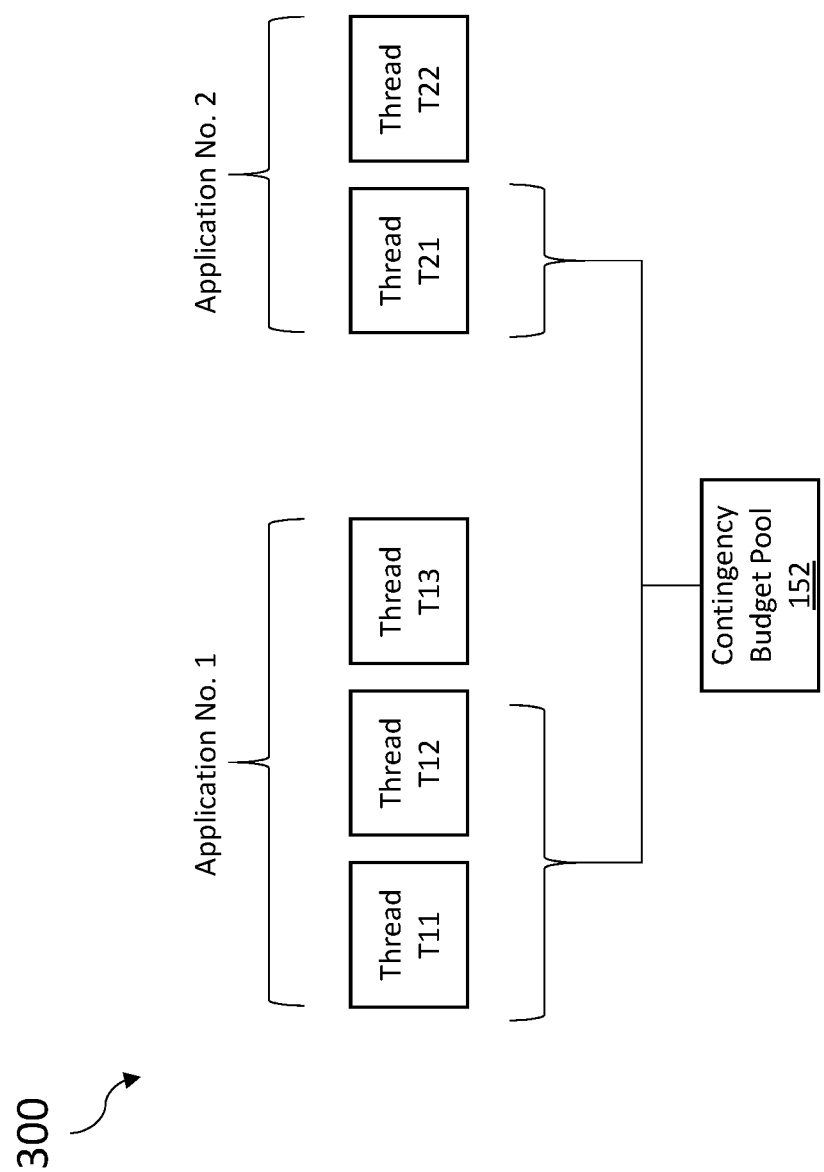
Figure 4:
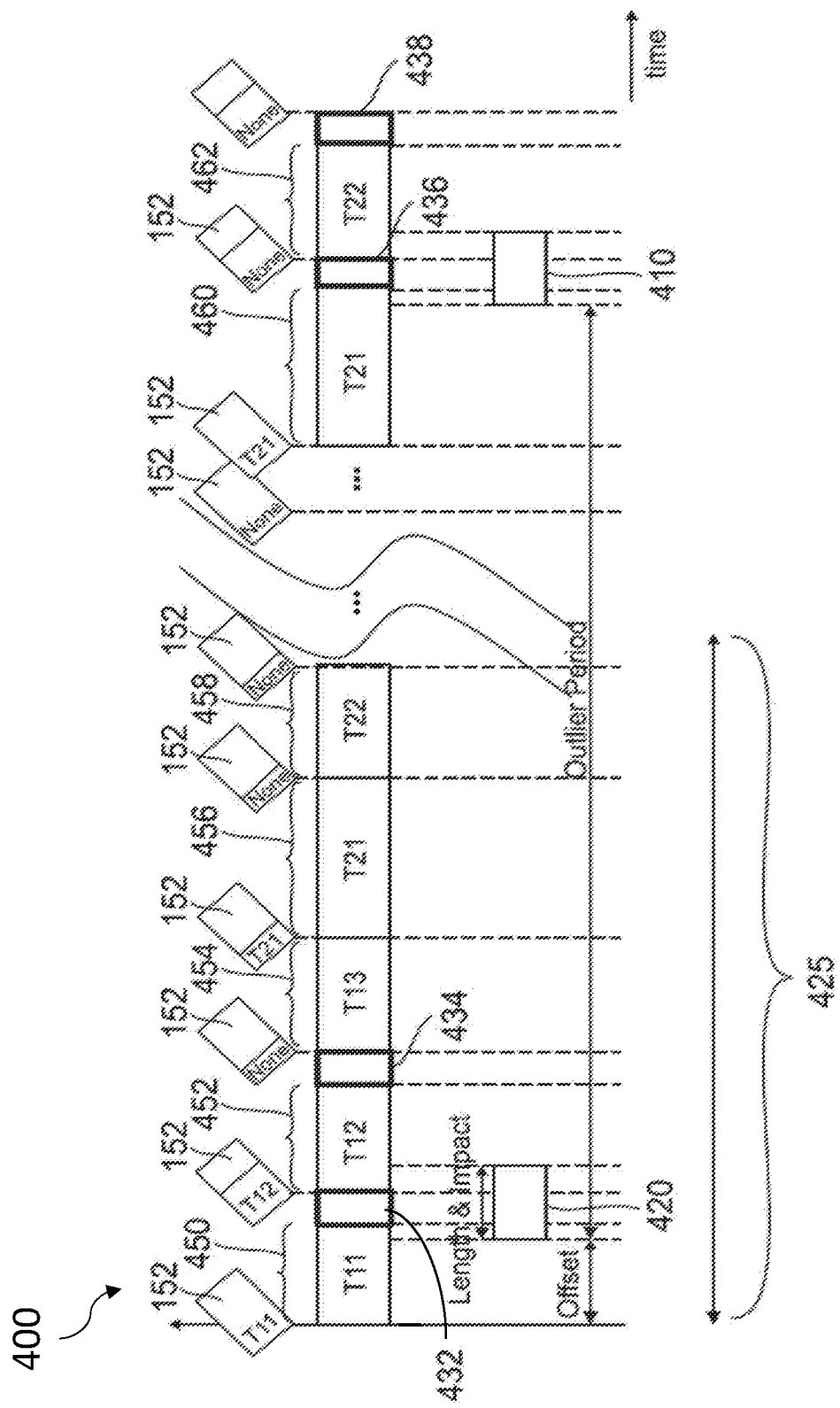
Figure 5:
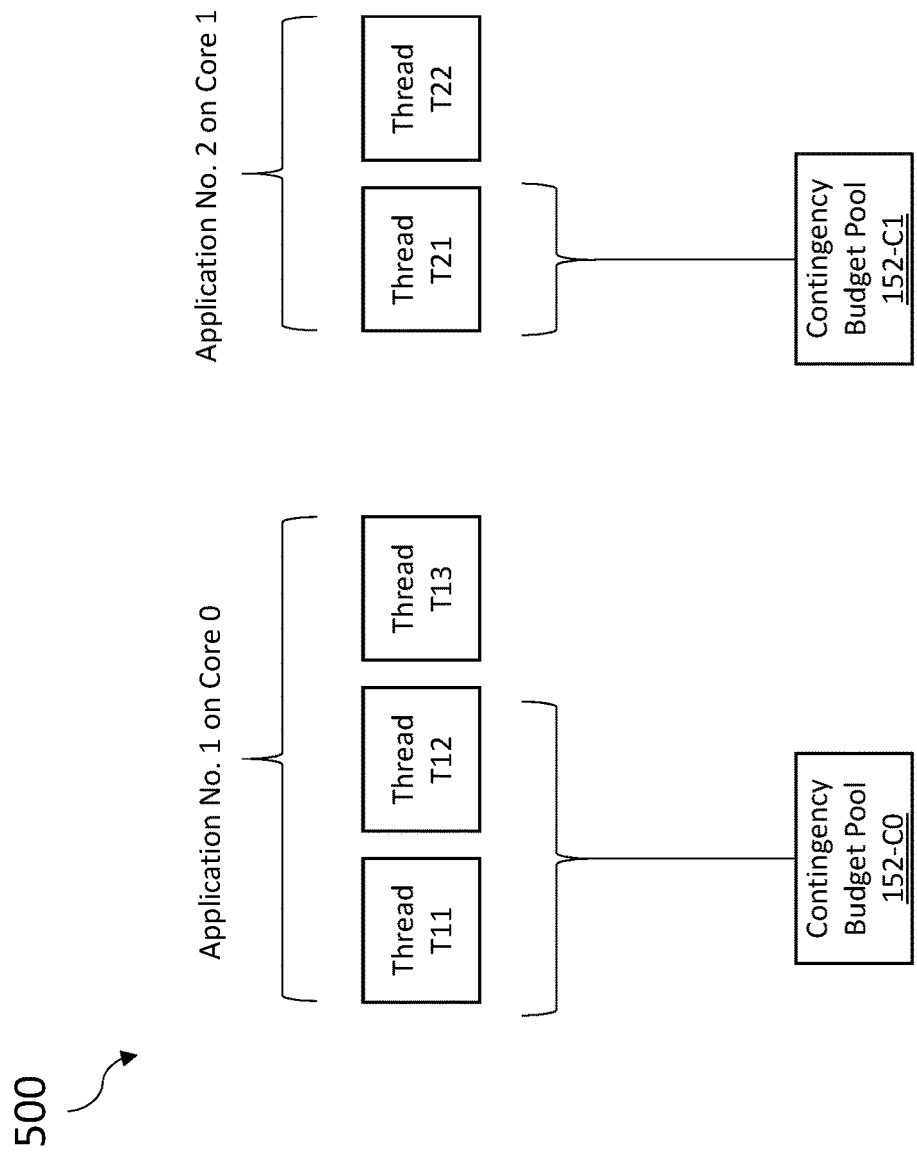
Figure 6:
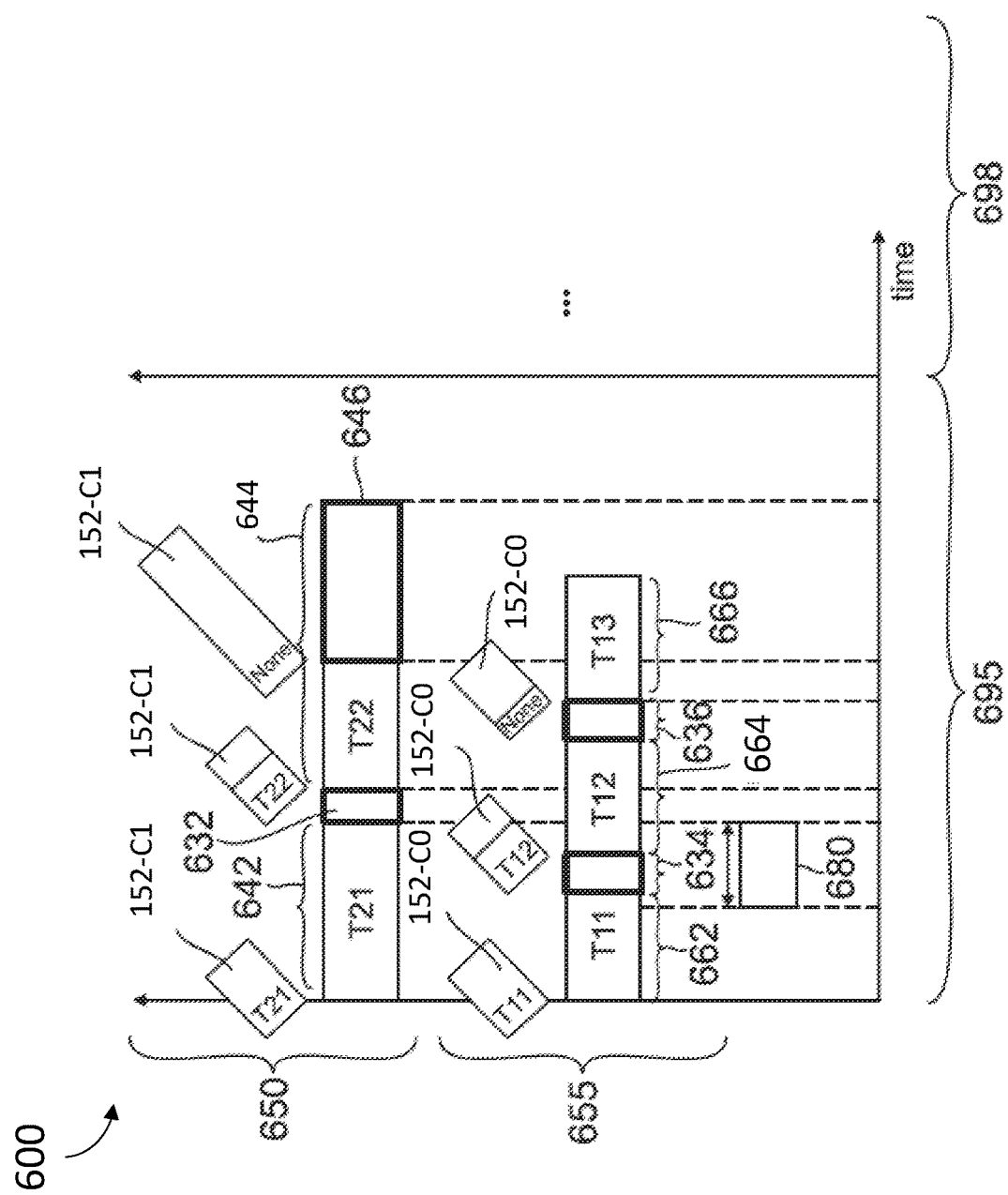
Figure 7:
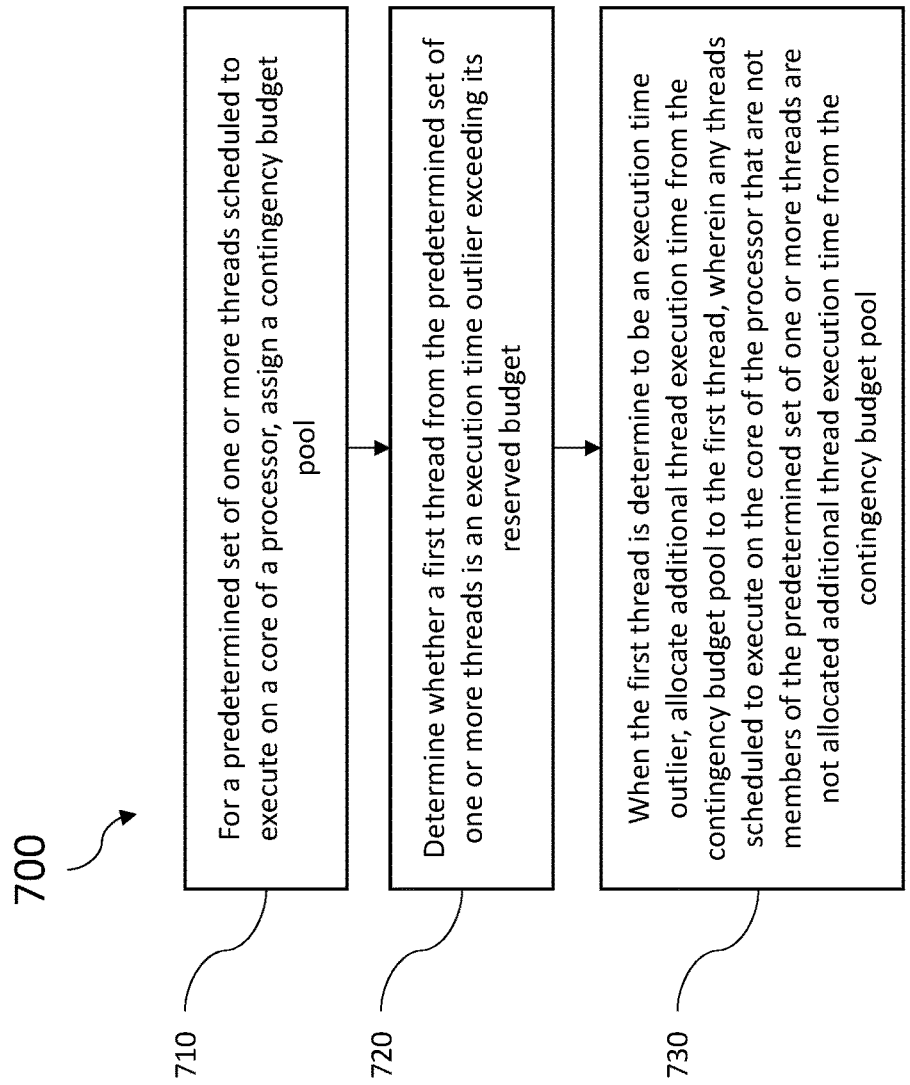

FIG. 2 provides a diagram illustrating an approach to address non-determinism in thread execution times using dedicated scheduling windows;

FIGS. 3 and 4 provides diagrams illustrating an approach to address non-determinism in thread execution times using contingency budgeting;

FIGS. 5 and 6 provides a diagram illustrating an approach to address non-determinism in thread execution times using contingency budgeting; and FIG. 7 illustrates an example method embodiment for mitigating non-determinism and variations in application execution times.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
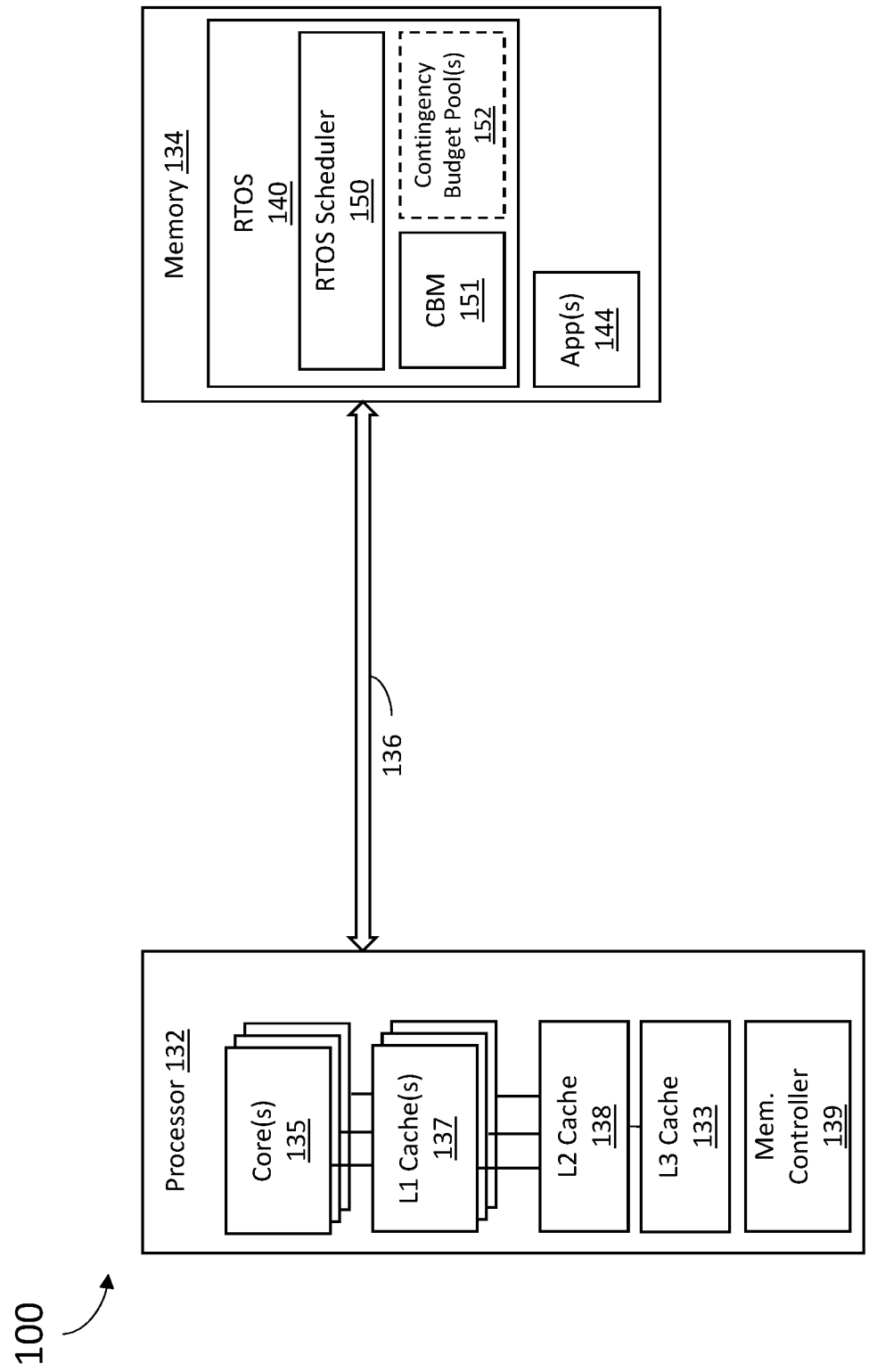
FIG. 1 is a block diagram illustrating an example computer system of one embodiment of the present disclosure configured to mitigate non-determinism and variations in application execution times.

FIG. 1 is a diagram of a computer architecture or system 100 of one embodiment of the present disclosure configured to mitigate non-determinism and variations in application execution times. Computer architecture 100 may generally be implemented in embedded systems, standard computing systems, and/or other implementations known to one having skill in the art. In the embodiment illustrated in FIG. 1, the computer architecture 100 is a system that comprises a single-core or multi-core processor 132 coupled to main memory 134 by a data bus (bus) 136. In some embodiments, the data bus 136 is optionally implemented, for example, in part with a Northbridge integrated circuit, and according to a standard such as a JEDEC standard. The embodiments disclosed herein are described with respect to one or more of the cores 135 of the processing unit 132 (which processing cores 135 may include one or more virtual cores). As such, it should be understood that the embodiments described herein are applicable generally to a processing system having any number of processing cores 135. Moreover, the terms "processor" or "processing unit", as used herein, generally refer to a computational device, which may also be a central processing unit (CPU) or digital signal processor (DSP), or other device capable of accepting data and performing mathematical and logical operations as instructed by program instructions. CPUs and/or DSPs can also be implemented by field programmable gate arrays and/or application specific integrated circuits. A processor, whether a CPU, DSP, or core thereof, is implemented by electronic circuitry, and may also referred to herein as a processing circuit.

As shown in FIG. 1, computing system 100 may optionally comprise a level one cache (L1) 137, where each L1 Cache is associated with and coupled to a unique core 135 of the processor 100. Computing system 100 may further optionally comprise a level two cache (L2) 138 which is coupled to each of the one or more cores 135 and level one cache 137 on the processor 132. It should be understood that in some implementations, additional caches and/or additional levels of cache (such as but not limited to an L3 cache as shown in FIG. 1) may be utilized by the computing system 100.

Applications are executed by the processor 132 within time partitions that define intervals of time where application threads are allowed to execute. Time partitioning facilitates to meet the time guarantees for critical applications. For example, critical applications executed on processing systems, such as system 100, using an operating system 140 such as, but not limited to, a real time operating system (shown in FIG. 1 as RTOS 140). For example, in aerospace systems real time operating systems utilize the concept of time partitioning to assure that each application or its component threads have sufficient guaranteed time budget to complete their respective tasks.

In some embodiments, the main memory 134 may comprise a dynamic random access memory (DRAM). Optionally, the main memory 134 may include ranks of memory, and each rank includes banks of memory. In one embodiment, the main memory 134 stores an RTOS 140 and at least one application 144 that comprises one or more threads. The RTOS 140, which is executed by the processor 132, provides an interface between the computing system 100 and the applications 144. The applications 144 are executed on one or more cores 135 of the processor 132, and for example may implement avionics applications such as a flight management system.

In the embodiment shown in FIG. 1, the system 100 includes a memory controller 139 that includes logic to read and write to portions of main memory 134. Using the memory controller 139 which controls accesses to the main memory 134, portions of main memory 134 may be copied to one or more of the first level cache 137 and/or second level cache 138. Program instructions, which may include the RTOS 140, and the applications 144, are stored in the main memory 134 which is non-transitory. At least a portion of the program instructions are read from the main memory 134 by the processor 132 for execution. These program instructions are also referred to herein as "applications" or "software".

As shown in FIG. 1, with embodiments of the present disclosure, system 100 includes a scheduling functionality 150 (illustrated in FIG. 1 as an RTOS Scheduler at 150) and a contingency budgeting manager 151 (shown in FIG. 1 as CBM 151). In some embodiments, the RTOS scheduler 150 may reside in, or otherwise constitute part of, the RTOS 140. In other embodiments, the scheduling function 150 can be located external to the RTOS 140. In some embodiments, the CBM 151 may reside in, or otherwise constitute part of, the RTOS 140. In other embodiments, the CBM 151 can be located external to the RTOS 150. In some embodiments, contingency budgeting manager 151 may optionally be implemented in hardware separate from the hardware hosting the RTOS 140.

The scheduling function 150 schedules the execution of program instructions on the processor 132. The scheduling function 150 may dynamically schedule the execution of program instructions or may schedule the execution of program instructions according to a static time definition. The scheduling function 150 in a time partitioned system defines the type of the scheduled software entity. For example, for the ARINC 653 scheduler, the scheduled software entity is an ARINC 653 process while for the rate-monotonic scheduler, it is a RMA thread. Hereafter, we generalize the reference to the scheduled software entity for time partitioned system as a thread. For any given application, 144, threads of that application may be executed on different cores 135 of the processor 132 in parallel, and threads executed on different cores 135 may simultaneously access shared L2 cache 138 and memory 134. As mentioned above, threads are considered either critical or non-critical. Both, critical and non-critical threads may run on slack. Unlike critical threads, non-critical threads may experience thread budget exceeded (TBE) exceptions (that is, they may be expected to regularly abuse their execution budgets).

The scheduling function 150 determines, at any given point in time, which threads are to be executed on each core 135 of the processor 132. In determining how to schedule the execution of threads, the scheduling function 150 uses a scheduling algorithm or policy that provides rules and methods for determining how to schedule the execution of threads. For example, the scheduling function 150 may use scheduling algorithms such as rate monotonic, priority preemptive, and/or round robin. In one implementation of such an embodiment, the scheduling function 150 uses a single scheduling algorithm for scheduling the execution of the threads on the various processing units in the processing system. In another implementation, the scheduling function 150 uses multiple scheduling algorithms for scheduling the execution of the threads on the different processing units in the processing system. For example, in such alternative implementations, the scheduling function 150 uses a first scheduling algorithm to schedule some of the threads for execution on a first processing unit and a second scheduling algorithm for scheduling the execution of some of the threads for execution on a second processing unit in the processing system. In one or more of the embodiments described herein, the scheduling function 150 via the Contingency Budgeting Manager 151, allocates additional contingency budget pool to the existing execution budgets (i.e., WCET) to threads in such a way that mitigates non-determinism and variations in application execution times, as described below. In some embodiments, the contingency budget manager 151 may rely on the scheduling function 150 to select the next scheduled thread. In case multiple contingency budget pools are available to a scheduled thread, then in some embodiments it is up to the contingency budget manager 151 to select which contingency budget to be used first, second, third . . . , or in other words it may have its own policy. If a thread has access to multiple contingency budget pools and the general slack, then the contingency budget manager 151 may decide to still use the general slack. In some embodiments, the threads can optionally be assigned to contingency budget pools based on core-affinity and window-affinity.

Outliers, meaning time instances of executed threads that have execution times that statistically deviate from a mean execution time associated with that thread (e.g., beyond a worst case execution time defined for that thread). As discussed above, outliers can be the result of several factors. For example, some outliers may be produced as a result of an external disturbance event (for example, a change in a computer architecture state such as DRAM refresh, bus delays, and the like) and may impact multiple threads. Other outliers may be the result of an internal event (for example, a specific application execution path that may take more time than usual) and have an impact on a single thread.

Figure 1A:
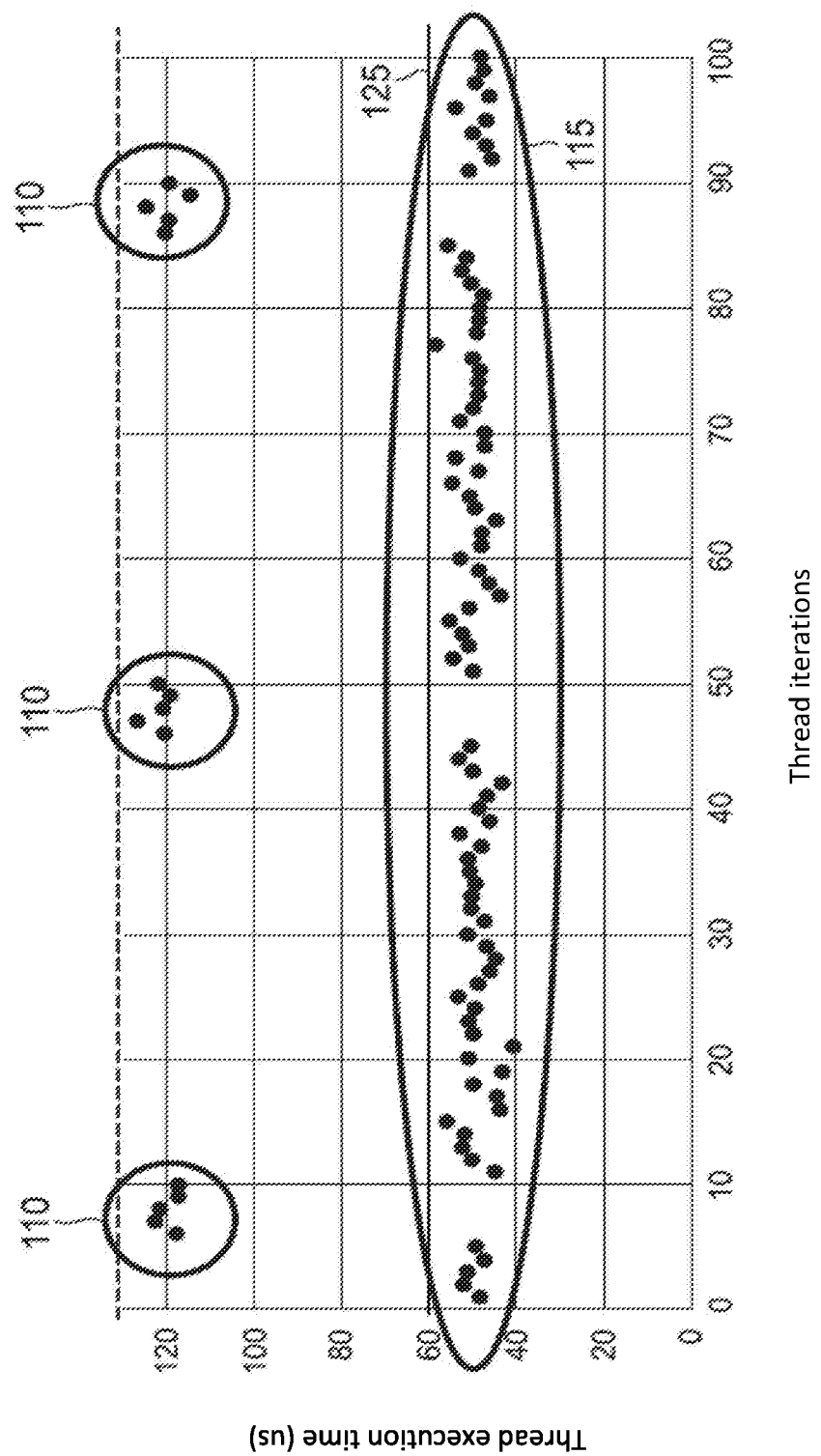
FIG. 1A is a diagram that illustrates outliers occurring during a time line depicting thread execution times versus thread iterations.

As an example, FIG. 1A illustrates a time line depicting thread execution times versus thread iterations. As shown generally at 115, across a series of 100 example thread iterations, the mean thread execution time falls between 40 and 60 micro-seconds (µs) with a mean of approximately 50 µs. Outliers, shown at 110, have execution times that fall squarely outside of the distribution of execution times about the mean, and outside the nominal WCET (shown at 125) expected for that application. In some embodiments, whether an executed thread is considered an outlier based on its execution time is determined statistically, such as if its execution time deviates from the mean by a statistically significant amount (for example, by one or two standard deviations, or as more than twice the mean). The particular threshold for considering an executed thread as an outlier may vary by system, and is a parameter that may be determined by the system designer, for example by considering what magnitude of extended execution times potentially result in a degradation of the processors ability to meet one or more design requirements for the system. Disturbance event causing outliers may be characterized by one or more of the following parameters. A first disturbance event parameter may be defined as the "Offset", meaning how much time (or number of iterations) from the start of an application execution does the disturbance event occur which causes the outlier. A second disturbance event parameter may be defined as the "Period", meaning the frequency of event reoccurrence. The third disturbance event parameter may be defined as "Length", meaning how long the event occurs i.e. duration of the event. In some cases, a series of disturbance events may occur sporadically as opposed to periodically, in which case the above three parameters may not be applicable. The fourth disturbance event parameter may be defined as "Impacts", meaning how much longer one or more thread execution times were extended with respect to the mean and/or worst-case execution times. One or more of these disturbance event parameters may be calculated and/or taken into consideration by a user of system 100, the RTOS scheduler 150, or the Contingency Budgeting Manager 151.

FIG. 2, generally at 200, provides a diagram illustrating a first approach to address non-determinism in thread execution times. In this first approach, the system 100 (or in some cases more particularly, the RTOS scheduler 150) establishes separate types of scheduling windows for performing thread executions. For example, FIG. 2 includes normal scheduling windows 225 (shown at 225-1, 225-2, 225-3 and 225-4) in which threads are executed that are not expected to experience outliers. In contrast, dedicated scheduling windows 210 (shown at 210-1, 210-2, 210-3) are scheduled to accommodate the execution of threads that are expected to experience outliers 210 (shown at 210-1, 210-2 and 210-3).

In some implementations, the scheduling of dedicated scheduling windows 220 for executing outliers may be particularly effective when the system 100 is experiencing very periodic outliers known to occur at predictable timing intervals for e.g. due to periodic hardware disturbances. In such cases, the system 100 may allocate to the RTOS scheduler 150 dedicated scheduling windows 220, which would align to the occurrences of the outliers and include a safety margin of additional time for threads scheduled therein (as compared to the normal scheduling windows 225). The amount of the safety margin may be determined, for example, based on the impact of outliers expected to potentially occur during these periods of time. That is, the timing of dedicated scheduling windows 225 attempts to mimic the regularity (or periodicity) of the expected outliers 210. In some embodiments, multiple independent dedicated scheduling windows 220 are established to accommodate independent outlier 210 initiators. In some embodiments, the system 100 may initially operate in a discovery phase during which time it identifies the offset and periodicity characteristics for one or more sets of outliers 210 and schedules the timing of dedicated scheduling windows 220 accordingly to coincide with the timing of the outliers 210. In some embodiments, the Contingency Budgeting Manager 151 may further observe the impact of outliers 210 that occur during the discovery phase to establish the amount of extra time that will be provided by the safety margins of dedicated scheduling windows 220 for completing the execution of threads. As shown in FIG. 2, thread iterations 1 to 100 are executed using normal scheduling windows 225 to accommodate the execution of threads during time period in which outliers are not expected, and dedicated scheduling windows 220 to accommodate (by scheduling a quantity of extra execution time) the execution of threads during time periods which have at least a threshold probability of outliers occurring.

Although in some embodiments, both normal scheduling windows 225 and dedicated scheduling windows 220 may be utilized to execute threads for the same application 144, in other embodiments, this need not be the case. For example, in some implementations, normal scheduling windows 220 may be used for executing threads of one or more applications 144 that are known to not experience outliers. Dedicated scheduling windows 220 may instead be utilized to execute threads for one or more applications 144 that are known to experience outliers 220. As such, only threads know to suffer from outliers 220 are provided with the safety-margin of additional execution time. This avoids the unnecessary processor 132 underutilization that would occur if all threads were unnecessarily provided with a safety-margin of additional execution time. In another implementation, scheduling windows 225 may be used for executing threads of one or more applications 144 that are known to not experience outliers, while dedicated scheduling windows 220 may instead be used to allow the processor to idle.

It is not always possible to align with the occurrences of outliers, in such cases, as an alternative approach to scheduling dedicated scheduling windows 220 as illustrated in FIG. 2, the Contingency Budgeting Manager 151 may instead implement an approach that utilizes contingency budgeting. Contingency budgeting provides a contingency budget pool that is exclusively shared by a predefined set of threads. It should be understood that the provided contingency budget pool may be one amongst multiple contingency budget pools. In some embodiments, a thread or subset of threads from the same or different applications may share one contingency budget pool. In some embodiments, a thread or subset of threads may have multiple contingency budget pools. Under contingency budgeting, the Contingency Budgeting Manager 151 operates under the premise that outliers exceeding their reserved budged can be expected to occur at some point during the execution of an application, and those outliers will have an impact on one or more, but not all, of the iterations during which its threads are executed.

Such an approach is illustrated in FIG. 3 at 300. In the example implementation shown in FIG. 3, a first application 144 (shown as Application No. 1) comprises a series of threads T11, T12 and T13 that are executed by the processor 132, and a second application 144 (shown at Application No. 2) comprises a series of threads T21 and T22 are also executed by the processor 132. A predetermined set of threads comprising T11, T12 and T21 (but not T13 or T22) are provided to the contingency budget pool 152 maintained by the Contingency Budgeting Manager 151. Through this contingency budget pool 152, the Contingency Budgeting Manager 151 establishes a reserve from which extra execution time may be drawn from so that if an outlier occurs during the execution of a thread from the predetermined set (T11, T12, T21), that thread will not run out of budget while being executed. A thread itself cannot detect when its own execution time is being affected to the point that it has become an outlier. Instead the Contingency Budgeting Manager 151 monitors execution and dynamically identifies when a thread from the predetermined thread(s) has not completed execution within the allocated budget set by the RTOS scheduler 150, and provides the outlier thread with a budget extension drawn from the contingency budget pool 152. The contingency budget pool 152 is a shared resource available for the set of multiple threads, so that each thread in the predetermined set needing a budget extension may be allocated that extra execution time by the Contingency Budgeting Manager 151 from the contingency budget pool 152. As such, it is unnecessary for scheduling function 150 to establish individual over-budget safety margins for each thread. Moreover, for this approach shown in FIG. 3, it is unnecessary to determine outlier characteristics such as offset and periodicity for the purpose of determining when extra execution time is likely to be needed. Instead, outlier characteristics such as periodicity and impact may be used by the Contingency Budgeting Manager 151 to statistically determine the amount of extra execution time that should be allocated to the contingency budget pool 152, and how long (e.g., how many thread execution iterations) the extra execution time in the contingency budget pool 152 can be expected to last. In some embodiments, the contingency budgeting manager 151 is pre-configured with a set of contingency budget pools 152 and is also pre-configured to associate eligible threads of the one or more applications 144 with each of the contingency budget pools. At runtime, the contingency budgeting manager 151 manages based on this pre-configuration.

It should be understood that the contingency budget pool 152 is not accumulated excess time that might be left over from previous thread executions (i.e., it is not accumulated slack time). Instead contingency budget pool 152 is a shared resource of execution time, statistically determined by the Contingency Budgeting Manager 151, and available to threads instances identified as outliers from a pre-defined set of threads. In some embodiments, separate contingency budget pools 152 may be established for different pre-defined sets of threads. In such embodiments, each contingency budget pool 152 may optionally be allocated to a set of threads defined, for example, based on the criticality of rate of execution of the set of threads. In some embodiments, the amount of extra execution time initially placed in a contingency budget pool 152 may be predicted from previous thread execution iterations. For example, it may be estimated that an additional time of 100 μs could be needed to execute a set of threads within a 250 milliseconds period. Accordingly, during a 250 milliseconds period of execution time for that set of threads, a contingency budget pool 152 would be allocated by the Contingency Budgeting Manager 151 with a total budget of 100 μs. In some embodiments, if a contingency budget pool 152 becomes exhausted, outlier threads may optionally continue execution by using the budget from any available slack that may remain from a previous thread that has completed execution.

In some embodiments, the extra time available for allocation from a contingency budget pool 152 may be reset during a replenish period. In some embodiments, the length of time (which may be expressed in thread iterations) that define a replenish period may be computed based on the fastest executing thread that is eligible to receive additional execution time from the contingency budget pool. In some embodiments, the amount of time available for allocation that is restored to the contingency budget pool 152 in the replenish period may be a set default, or may be computed based on disturbance event parameters such as the length and impact or outlier expected to affect the threads having access to the contingency budget pool 152. Note, there is no need to know the offset of any outlier because the complete contingency budget pool 152 is available immediately from the first thread instance execution. Moreover, if the periodicity of the outliers is lower than the fastest thread, then it is not necessary to consider the outlier period as well.

It should be noted that a single disturbance event may occur at the boundary of a replenish period. As such, in some embodiments, when threads are scheduled to occur during this disturbance event, and the scheduled threads have access to a contingency budget pool 152, then in some embodiments, the Contingency Budgeting Manager 151 will use the contingency budget pool 152 from the two consecutive replenish periods for the execution of those threads.

In some embodiments, utilization of the contingency budgeting approach may be used such that the WCET of a critical thread may be defined as being be equal to the Mean execution time, or for example, defined based on some fraction thereof (for example, the 90% quantile of the mean execution time). The contingency budgeting approach may be used by computing the time allocated to the contingency budget pools to account for all known rare timing disturbances. The contingency budget pools become available even to non-slack consumers.

The size of the contingency budget, either as originally allocated, or allocated per replenish period, may be determined as a function of the length of the replenish period, and the length and impact of potential outliers. In some embodiments, length and impact of potential outliers may be estimated during a discovery period where the Contingency Budgeting Manager 151 or other component of the system 100 observes and evaluates outliers and their disturbance event parameters. The Contingency Budgeting Manager 151 may group threads with different execution rates to different contingency budget pools and replenish the contingency budget pools at the rate of the threads allocated to the pool. For example, if the Contingency Budgeting Manager 151 replenishes a contingency budget pool at the fastest rate applied on the system 100, then it may combine the contingency budget approach with a sliding-window concept. In some embodiments, when all critical threads allocated to the contingency budget pool complete their execution within a window, then part or all of the contingency budget pool (as further discussed below) may transition to general budget pool (produced due to earlier completion of the critical threads) and make it available for the non-critical threads. If sliding windows are used, then the next scheduling window may start earlier.

Embodiments having contingency budget pool as disclosed herein can be also used for thermal throttling and/or in conjunction with allocation of environmentally regulated slack as disclosed in U.S. Pat. No. 9,465,664 "SYSTEMS AND METHODS FOR ALLOCATION OF ENVIRONMENTALLY REGULATED SLACK" which is incorporated herein by reference in its entirety.

FIG. 4, generally at 400, provides a diagram further illustrating one possible implementation of the contingency budgeting pool to address non-determinism in thread execution times on a single core processor. As shown in FIG. 4, the threads T11 and T12 of the Application No.1 and thread T21 of Application No. 2 have access to additional execution time from a contingency budget pool 152, if they should be determined to have outlier execution times. In this example, T11 may comprise a rate monotonic algorithm (RMA) thread with highest rate. Thread T11 experiences a disturbance event 420 causing it to become an outlier that extends the actual time needed to complete execution of thread T11 by a duration 432. Accordingly, when the nominal budget 450 allocated to T11 by scheduling function 150 is depleted, the thread may proceed to use the extra execution time budget available from contingency budget pool 152 to continue to complete execution. Thus, at the end of execution of thread T11, contingency budget pool 152 is at least partially depleted because it has used up some of its originally allocated budget. Processor 132 then proceeds to execute thread T12, which may also comprise an RMA thread with the highest rate. Accordingly, T12 also part of the predefined set of threads that has access to the contingency budget pool 152. In the example shown in FIG. 4, T12 is also an outlier caused by a disturbance event (shown at 420). In this particular case, the outlier has been triggered by a disturbance external to the thread. Examples for such disturbance might be the computer architecture or an interrupt. Thus, when the execution of thread T12 is extended by a disturbance event 420 by duration 434, it is unable to complete execution within its allocated budget 452. T12 is permitted to complete execution by using at least some of the remaining budget from contingency budget pool 152.

Unlike threads T11 and T12, thread T13 is not a member of a predefined set of threads that has access to the contingency budget pool 152. In the example shown in FIG. 4, thread T13 does not experience an outlier and completes its execution within its allocated budget 454.

Processor 132 then proceeds to execution of thread T21. As shown in FIG. 4, thread T21 is a member of the predefined set that has access to contingency budget pool 152. However, thread T21 does not experience an outlier and completes execution within its budget 456 without requiring use of the contingency budget pool 152. As such contingency budget pool 152 is not further depleted by the execution of thread T21. Execution of thread T22 begins after execution of thread T21 is completed. In the example shown in FIG. 4, thread T22 does not have access to contingency budget pool 152 and is able to complete execution within its budget 458. In this example, the completion of execution of thread T22 marks the completion of a current scheduling window of scheduled threads as shown at 425.

At the end of the current scheduling window 425 the next scheduling window begins and the contingency budget pool 152 gets replenished at the beginning of the next scheduling window. The replenished contingency budget pool 152 is available to threads T11, T12 and T21 for the next scheduling window. As shown in FIG. 4, in this example, during the next scheduling window, thread T21 experiences an outlier due to a disturbance event 410. Accordingly, the execution of thread T21 is extended by duration 436 as it is unable to complete execution within its budget 460. Thread T21 has access to the replenished contingency budget pool 152 and is able to complete its execution using the budget from pool 152. Thread T22 (having the budget shown by 462) begins execution after completion of thread T21. In this scheduling window, thread T22 is also affected by disturbance event 410. However, because T22 does not have access to contingency budget pool 412, T22 exhausts its budget 462 and is preempted from execution. In some embodiments, the occurrence of such an event causes a thread budget exceeded (TBE) exception to be generated as it completes its execution over duration 438.

FIG. 5 provides an example of one possible implementation of the contingency budget pool approach to address non-determinism for embodiments having a processor 132 that comprises multiple cores 135. In the example implementation shown in FIG. 3, the same first application 144 illustrated in FIG. 3 comprises the series of threads T11, T12 and T13 that in this embodiment are executed by a first core 135 of the processor 132 (shown as Application No. 1 on Core 0). The second application 144 that was illustrated in FIG. 3 comprises the series of threads T21 and T22 that in this embodiment are executed by a second core 135 of the processor 132 (shown as Application No. 2 on Core 1). In this embodiment, Application 1 and Application 2 are executed by their respective cores 135 in the same scheduling windows. The Contingency Budgeting Manager 151 establishes a separate contingency budget pool 135 for each one of the cores 135 (contingency budget pool 152-C0 for core 0 and contingency budget pool 152-C1 for core 1), where the contingency budget pool on each one of the cores might or might not be of equal size. The predetermined set of threads comprising T11, T12 would therefore have access as necessary to the reserve of time afforded by contingency budget pool 152-C0. The predetermined set of threads comprising T21 would therefore have access as necessary to the reserve of time afforded by contingency budget pool 152-C1.

FIG. 6, generally at 600, provides a diagram further illustrating one possible implementation of the contingency budgeting pool to address non-determinism in thread execution times on a multicore processor. In FIG. 6, the threads of Application No. 1 are running on core C0, as illustrated at 655, while the threads of Application No. 2 are running on core C1, as illustrated at 650. The contingency budget pool 152-C1 is allocated for use by thread T21. The contingency budget pool 152-C0 is allocated for use by threads T11 and T12. Both Application No. 1 and Application No. 2 are running within the same scheduling window 695.

In this example, a disturbance event occurs (shown at 680) that causes an impact on the execution of thread T21 causing that instance of thread T21 to become an outlier that does not complete execution within its allocated budget 642. Thus, when thread T21 exhausts its allocated budget 640 and fails to complete execution within duration of budget 640, Contingency Budgeting Manager 151 allocates extra time 632 from the contingency budget pool 152-C1 for T21 to continue execution.

Thread T22 does not experience an outlier and finishes execution within its allocated budget 644. In the example shown in FIG. 6, when thread T22 finishes execution, an excess of execution time budget (shown at 646) from the allocated budget 644 still remains unused. Accordingly, in some embodiments, this excess of execution time budget 646 may be donated as slack on core C1 for threads designed to use available slack. Alternately, in other embodiments, this excess of execution time budget 646 may be allocated to contingency budget pool 152-C1. Consequently, in some instance a contingency budget pool may become larger during the scheduling window than was allocated at the beginning of the replenish period. In yet another possible example implementation, after the last critical thread completes execution, any remaining execution time in the contingency budget pool 152-C1 may be transitioned into general slack that becomes available for slack consumer threads that run on that core C1. For example, in the example shown in FIG. 6, thread T22 is the last critical thread that is scheduled on core C1 for scheduling window 695. Accordingly, after thread T22 completes execution, remaining execution time in the contingency budget pool 152-C1 may be transferred from pool 152-C1 and made available for slack consumer threads that run on core C1.

For Application No. 1, the execution time 662 of thread T11 and execution time 664 of thread T12 is also impacted by a disturbance event at 680 causing them to become outliers. In this example, no event occurs during the execution time 666 of thread T13.

Contingency Budgeting Manager 151 allocates extra time 634 from contingency budget pool 152-C0 to complete execution. Contingency Budgeting Manager 151 allocates extra time 636 to thread T12 contingency budget pool 152-C0 to complete execution. Because thread T13 is not a member of the pre-determined set of threads having access to contingency budget pool 152-C0, the remaining budget from the contingency budget pool 152-C0 is not available for thread T13. In some embodiments, the remaining budget may be transferred to the general slack of the first core C0, or may be allocated to contingency budget pool 152-C0 for use in the next scheduling window 698, and it should be understood that this may be done for a fixed scheduling window or a sliding schedule window such as described above. In some embodiments, if there are no threads marked as slack consumers, then a core may be left idle until next scheduling window 698 begins.

In some embodiments, if after a contingency budget in a contingency budget pool 152 is transferred to the general slack for a core 135, the RTOS 140 (e.g. Scheduling Function 150) may decide if threads marked as slack consumers are to be scheduled. For example, if there are no threads that remain to be scheduled across all cores within the scheduling window then the scheduling function 150 can allocate the general slack to be used to slide the next scheduling window 698. That is, if there are no threads that remains to be scheduled across the cores 135 of processor 132, the next scheduling window 698 will begin when the last scheduled thread across the cores 135 completes its execution.

It should be appreciated that in any particular embodiment, the Contingency Budgeting Manager 151 need not be statically configured to apply just one mitigation approach. That is, in some embodiments, the Contingency Budgeting Manager 151 may evaluate the occurrence of outliers and determine, based on the outlier characteristics observed, which mitigation approach is best suited for the types of outliers being observed. Moreover, in some embodiments, a combination of the approaches described herein may be simultaneously implemented by a Contingency Budgeting Manager 151, for example to apply different approaches to different sets of threads. For example, dedicated scheduling windows may be implemented for one set of threads (for example, a set experiencing relatively periodic disturbance event causing outliers) while a contingency budget pool may be implemented for another set of threads (for example, a set experiencing relatively sporadic disturbance events causing outliers).

FIG. 7 is a flow diagram of an example method 700 for outlier thread mitigation for either a single or multicore processing system such as described in any of the embodiment disclosed above. It should be understood that the features and elements described herein with respect to the method 700 shown in FIG. 7 and the accompanying description may be used in conjunction with, in combination with, or substituted for elements of any of the other embodiments discussed with respect to FIGS. 1-6, or elsewhere herein, and vice versa. Further, it should be understood that the functions, structures and other description of elements associated with embodiments of FIG. 7 may apply to like named or described elements for any of the other figures and embodiments and vice versa.

The method 700 begins at 710 where, for a predetermined set comprising one or more application threads that are scheduled to be executed on a core of a processor, a contingency budget pool is assigned. In some embodiments, the scheduling function for the processor includes a Contingency Budgeting Manager that determines which threads executed on the core are members of the predetermined set that have access to the contingency budget pool. The amount of budget execution time placed in the contingency budget pool, and how often it is replenished, may be determined in any of the manners described above. In some embodiments, multiple contingency budget pools may be established by the Contingency Budgeting Manager for different predetermined sets comprising application threads that are scheduled to be executed on the core. Moreover, for multicore processor, separate contingency budget pools may be established by the Contingency Budgeting Manager for predetermined sets of threads being executed by each respective core. In some embodiments, a contingency budgeting manager for the processing system is pre-configured with a set of contingency budget pools and associates eligible threads of the one or more applications with each of the contingency budget pools The method 700 proceeds to 720 with determining whether a first thread from the predetermined set of one or more threads is an execution time outlier exceeding its reserved budget. This determination may be performed by the Contingency Budgeting Manager by monitoring the execution time of the first thread and observing that it has exceeded a predefined threshold execution time so as to be considered an outlier. In some embodiments, the predefined threshold execution time is determined statistically such as by establishing the thread's execution time has deviated from the mean execution time for that thread, or the WCET, by a statistically significant amount. For example, a statistically significant deviation may be defined as an execution time more than some predefined number of standard deviations from the mean (for example, 1 or 2 standard deviations). When the first thread is determined to be an execution time outlier, the method 700 may proceed to 730 with allocating additional thread execution time from the contingency budget pool to the first thread, wherein any threads scheduled to execute on the core of the processor that are not members of the predetermined set of one or more threads are not allocated additional thread execution time from the contingency budget pool. By providing this additional thread execution time from the contingency budget pool to the thread, it may be allowed to complete execution in an orderly manner and as such mitigating the occurrence of the outlier thread.

EXAMPLE EMBODIMENTS

Example 1 includes a computer system with outlier thread mitigation, the system comprising: a processor coupled to a memory, the processor comprising one or more processing cores; a time-partitioned scheduling function, wherein the scheduling function schedules the execution of one or more applications on the one or more processing cores of the processor, wherein the one or more applications each comprise one or more threads; a contingency budgeting manager that defines at least a first pre-determined set of threads from the one or more threads of the one or more applications and assigns a contingency budget pool to the first pre-determined set of threads, wherein the first pre-determined set of threads are each scheduled by the scheduling function to execute on a first processing core of the one or more processing cores, wherein the contingency budgeting manager is pre-configured with a set of contingency budget pools and pre-configured to associate eligible threads of the one or more applications with each of the contingency budget pools; wherein the contingency budgeting manager is further configured to monitor execution of each of the threads of the first pre-determined set of threads to identify when a first thread from the predetermined set of one or more threads is an execution time outlier exceeding a reserved budget; wherein when the contingency budgeting manager determines that the first thread is an execution time outlier, the contingency budgeting manager allocates budget from the contingency budget pool to the first thread execution time.

Example 2 includes the system of example 1, wherein any threads scheduled to execute on the first processing core of the processor that are not members of the first predetermined set of one or more threads are not allocated additional thread execution time from the contingency budget pool.

Example 3 includes the system of any of examples 1-2, wherein the contingency budgeting manager defines a second pre-determined set of threads from the one or more threads of the one or more applications and assigns a second contingency budget pool to the second pre-determined set of threads.

Example 4 includes the system of example 3, wherein the second pre-determined set of threads are scheduled by the scheduling function to execute on the first processing core.

Example 5 includes the system of any of examples 3-4, wherein the second pre-determined set of threads are scheduled by the scheduling function to execute on a second processing core of the processor.

Example 6 includes the system of 5, wherein the second pre-determined set of threads are scheduled by the scheduling function to execute on the second processing core of the processor in a same scheduling window as the first pre-determined set of threads are scheduled to execute on the first processing core.

Example 7 includes the system of any of examples 1-6, wherein the contingency budgeting manager determines which of the one or more threads of the one or more applications are assigned to the first pre-determined set of threads based on a history of outliers experienced by the first pre-determined set of threads.

Example 8 includes the system of any of examples 1-7, wherein the contingency budgeting manager determines an amount of additional thread execution time allocated to the contingency budget pool based on one or both of an expected impact or and expected length of outliers occurring during execution of threads of the first pre-determined set of threads.

Example 9 includes the system of any of examples 1-8, wherein the scheduling function is configured to allocate unused thread execution time from the contingency budget pool to execute slack consuming threads on the first processing core.

Example 10 includes the system of any of examples 1-9, wherein the system operates using a real time operating system, wherein the contingency budgeting manager is implemented on hardware separate from hardware implementing the real time operating system.

Example 11 includes a method for outlier thread mitigation for a processing system, the method comprising: for a predetermined set of one or more threads scheduled to execute on a core of a processor, assigning a contingency budget pool, wherein a contingency budgeting manager for the processing system is pre-configured with a set of contingency budget pools and associates eligible threads of one or more applications with each of the contingency budget pools; determining whether a first thread from the predetermined set of one or more threads is an execution time outlier exceeding a reserved budget; and when the first thread is determined to be an execution time outlier, allocating additional thread execution time from the contingency budget pool to the first thread, wherein any threads scheduled to execute on the core of the processor that are not members of the predetermined set of one or more threads are not allocated additional thread execution time from the contingency budget pool.

Example 12 includes the method of example 11, wherein the predetermined set of one or more threads comprises threads of one or more applications.

Example 13 includes the method of any of examples 11-12, wherein determining whether a first thread from the predetermined set of one or more threads is an execution time outlier, comprises monitoring execution of each of the threads of the first pre-determined set of threads to identify when the first thread from the predetermined set of one or more threads is an execution time outlier.

Example 14 includes the method of any of examples 11-13, further comprising: defining a second pre-determined set of threads from the one or more threads of the one or more applications; and assigning a second contingency budget pool to the second pre-determined set of threads.

Example 15 includes the method of example 14, wherein the second pre-determined set of threads are scheduled by a scheduling function to execute on the first processing core.

Example 16 includes the method of any of examples 14-15, wherein the second pre-determined set of threads are scheduled by a scheduling function to execute on a second processing core of the processor.

Example 17 includes the method of example 16, wherein the second pre-determined set of threads are scheduled by the scheduling function to execute on the second processing core of the processor in a same scheduling window as the second pre-determined set of threads are scheduled to execute on the first processing core.

Example 18 includes the method of any of examples 11-17, wherein the system comprises a contingency budgeting manager that determines which of the one or more threads of the one or more applications are assigned to the first pre-determined set of threads based on a history of outliers experienced by the first pre-determined set of threads.

Example 19 includes the method of any of examples 11-18, wherein the system comprises a contingency budgeting manager determines an amount of additional thread execution time allocated to the contingency budget pool based on one or both of an expected impact or and expected length of outliers occurring during execution of threads of the first pre-determined set of threads.

Example 20 includes a computer system with outlier thread mitigation, the system comprising: a processor coupled to a memory, the processor comprising one or more processing cores; a scheduling function, wherein the scheduling function schedules the execution of one or more applications on the one or more processing cores of the processor, wherein the one or more application each comprise one or more threads; and a contingency budgeting manager that defines at least a first pre-determined set of threads from the one or more threads of the one or more applications; wherein the scheduling function schedules the execution of threads of the first pre-determined set of threads within dedicated scheduling windows, and schedules the execution of threads not of the first pre-determined set of threads within normal scheduling windows, wherein the dedicated scheduling windows provide an execution time budget longer than an execution time budget provided by the normal scheduling windows; wherein the contingency budgeting manager determines which of the one or more threads of the one or more applications are assigned to the first pre-determined set of threads based on a history of outliers associated with the first pre-determined set of threads.

In various alternative embodiments, system elements, method steps, or examples described throughout this disclosure (such as the processors, cores, caches, data busses, controllers, operating systems, applications, scheduling functions, contingency budgeting manager, and contingency budget pools, and/or sub-parts thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "processor", "processing unit", "processing cores", "cores", "caches", "memory", "data bus", "controller", "thread", "process", "operating system", "application", "scheduling function" , "contingency budgeting manager" and "contingency budget pool", each refer to non-generic elements of a computing system that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A computer system with outlier thread mitigation, the system comprising:
 a processor coupled to a memory, the processor comprising one or more processing cores;
 a time-partitioned scheduling function, wherein the scheduling function schedules the execution of one or more applications on the one or more processing cores of the processor, wherein the one or more applications each comprise one or more threads;

a contingency budgeting manager that defines at least a first pre-determined set of threads from the one or more threads of the one or more applications and assigns a contingency budget pool to the first pre-determined set of threads, wherein the first pre-determined set of threads are each scheduled by the scheduling function to execute on a first processing core of the one or more processing cores, wherein the contingency budgeting manager is pre-configured with a set of contingency budget pools and pre-configured to associate eligible threads of the one or more applications with each of the contingency budget pools;

wherein the contingency budgeting manager is further configured to monitor execution of each of the threads of the first pre-determined set of threads to identify when a first thread from the predetermined set of one or more threads is an execution time outlier exceeding a reserved budget;

wherein when the contingency budgeting manager determines that the first thread is an execution time outlier, the contingency budgeting manager allocates budget from the contingency budget pool to the first thread execution time.

2. The system of claim 1, wherein any threads scheduled to execute on the first processing core of the processor that are not members of the first predetermined set of one or more threads are not allocated additional thread execution time from the contingency budget pool.

3. The system of claim 1, wherein the contingency budgeting manager defines a second pre-determined set of threads from the one or more threads of the one or more applications and assigns a second contingency budget pool to the second pre-determined set of threads.

4. The system of claim 3, wherein the second pre-determined set of threads are scheduled by the scheduling function to execute on the first processing core.

5. The system of claim 3, wherein the second pre-determined set of threads are scheduled by the scheduling function to execute on a second processing core of the processor.

6. The system of claim 5, wherein the second pre-determined set of threads are scheduled by the scheduling function to execute on the second processing core of the processor in a same scheduling window as the first pre-determined set of threads are scheduled to execute on the first processing core.

7. The system of claim 1, wherein the contingency budgeting manager determines which of the one or more threads of the one or more applications are assigned to the first pre-determined set of threads based on a history of outliers experienced by the first pre-determined set of threads.

8. The system of claim 1, wherein the contingency budgeting manager determines an amount of additional thread execution time allocated to the contingency budget pool based on one or both of an expected impact or and expected length of outliers occurring during execution of threads of the first pre-determined set of threads.

9. The system of claim 1, wherein the scheduling function is configured to allocate unused thread execution time from the contingency budget pool to execute slack consuming threads on the first processing core.

10. The system of claim 1, wherein the system operates using a real time operating system, wherein the contingency budgeting manager is implemented on hardware separate from hardware implementing the real time operating system.

11. A method for outlier thread mitigation for a processing system, the method comprising:

for a predetermined set of one or more threads scheduled to execute on a core of a processor, assigning a contingency budget pool, wherein a contingency budgeting manager for the processing system is pre-configured with a set of contingency budget pools and associates eligible threads of one or more applications with each of the contingency budget pools;

determining whether a first thread from the predetermined set of one or more threads is an execution time outlier exceeding a reserved budget; and when the first thread is determined to be an execution time outlier, allocating additional thread execution time from the contingency budget pool to the first thread, wherein any threads scheduled to execute on the core of the processor that are not members of the predetermined set of one or more threads are not allocated additional thread execution time from the contingency budget pool.

12. The method of claim 11, wherein the predetermined set of one or more threads comprises threads of one or more applications.

13. The method of claim 11, wherein determining whether a first thread from the predetermined set of one or more threads is an execution time outlier comprises, monitoring execution of each of the threads of the first pre-determined set of threads to identify when the first thread from the predetermined set of one or more threads is an execution time outlier.

14. The method of claim 11, further comprising:
defining a second pre-determined set of threads from the one or more threads of the one or more applications; and
assigning a second contingency budget pool to the second pre-determined set of threads.

15. The method of claim 14, wherein the second pre-determined set of threads are scheduled by a scheduling function to execute on the first processing core.

16. The method of claim 14, wherein the second pre-determined set of threads are scheduled by a scheduling function to execute on a second processing core of the processor.

17. The method of claim 16, wherein the second pre-determined set of threads are scheduled by the scheduling function to execute on the second processing core of the processor in a same scheduling window as the second pre-determined set of threads are scheduled to execute on the first processing core.

18. The method of claim 11, wherein the system comprises a contingency budgeting manager that determines which of the one or more threads of the one or more applications are assigned to the first pre-determined set of threads based on a history of outliers experienced by the first pre-determined set of threads.

19. The method of claim 11, wherein the system comprises a contingency budgeting manager determines an amount of additional thread execution time allocated to the contingency budget pool based on one or both of an expected impact or and expected length of outliers occurring during execution of threads of the first pre-determined set of threads.

20. A computer system with outlier thread mitigation, the system comprising:
a processor coupled to a memory, the processor comprising one or more processing cores;

a scheduling function, wherein the scheduling function schedules the execution of one or more applications on the one or more processing cores of the processor, wherein the one or more application each comprise one or more threads; and a contingency budgeting manager that defines at least a first pre-determined set of threads from the one or more threads of the one or more applications;

wherein the scheduling function schedules the execution of threads of the first pre-determined set of threads within dedicated scheduling windows, and schedules the execution of threads not of the first pre-determined set of threads within normal scheduling windows, wherein the dedicated scheduling windows provide an execution time budget longer than an execution time budget provided by the normal scheduling windows;

wherein the contingency budgeting manager determines which of the one or more threads of the one or more applications are assigned to the first pre-determined set of threads based on a history of outliers associated with the first pre-determined set of threads.

* * * * *